(12) United States Patent
Park

(10) Patent No.: US 11,511,425 B2
(45) Date of Patent: Nov. 29, 2022

(54) ROBOT STOPPING PARALLEL TO INSTALLED OBJECT AND METHOD OF STOPPING THE SAME

(71) Applicant: LG ELECTRONICS INC., Seoul (KR)

(72) Inventor: Hye Ri Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 293 days.

(21) Appl. No.: 16/750,855

(22) Filed: Jan. 23, 2020

(65) Prior Publication Data

US 2020/0298405 A1 Sep. 24, 2020

(30) Foreign Application Priority Data

Mar. 19, 2019 (WO) ............... PCT/KR2019/003182
Sep. 27, 2019 (KR) ........................ 10-2019-0119796

(51) Int. Cl.
*B25J 9/16* (2006.01)

(52) U.S. Cl.
CPC ............. *B25J 9/1666* (2013.01); *B25J 9/162* (2013.01)

(58) Field of Classification Search
CPC . B25J 9/1666; B25J 9/162; G05D 2201/0216; A47L 2201/04
See application file for complete search history.

(56) References Cited

U.S. PATENT DOCUMENTS

| 8,340,823 | B2* | 12/2012 | Ohno ....................... G06T 7/20 |
| | | | 700/262 |
| 9,545,880 | B2* | 1/2017 | Kajiwara .................. B60R 1/00 |
| 2007/0032904 | A1* | 2/2007 | Kawagoe ............. G05D 1/0227 |
| | | | 701/23 |
| 2017/0273531 | A1* | 9/2017 | Watanabe ............ A47L 9/0411 |
| 2017/0332871 | A1* | 11/2017 | Sung ......................... A47L 5/22 |
| 2017/0368691 | A1* | 12/2017 | Li ........................ G05D 1/0221 |
| 2018/0346299 | A1 | 12/2018 | High et al. |
| 2019/0090711 | A1* | 3/2019 | Lee ....................... A47L 9/2857 |

FOREIGN PATENT DOCUMENTS

| JP | 5-286453 | A | | 11/1993 |
| JP | 05286453 | A | * | 11/1993 |
| JP | 2004246436 | A | * | 9/2004 |
| KR | 10-2005-0011055 | A | | 1/2005 |
| KR | 10-2013-0136113 | A | | 12/2013 |
| KR | 20130136113 | A | * | 12/2013 |
| KR | 10-2016-0011390 | A | | 2/2016 |
| KR | 10-2016-0077531 | A | | 7/2016 |
| KR | 10-1694001 | B1 | | 1/2017 |
| KR | 10-1832076 | B1 | | 2/2018 |

* cited by examiner

*Primary Examiner* — Khoi H Tran
*Assistant Examiner* — Nhi Q Bui
(74) *Attorney, Agent, or Firm* — Birch, Stewart, Kolasch & Birch, LLP

(57) ABSTRACT

Disclosed herein is a robot stopping parallel to an installed object and a method of stopping the same. In the robot stopping parallel to an installed object, a pause state of the robot is determined, and when an obstacle sensor calculates distances from obstacles, the robot moves such that the robot is placed parallel and close to an adjacent one of installed objects disposed around the robot.

18 Claims, 13 Drawing Sheets

FIG. 4
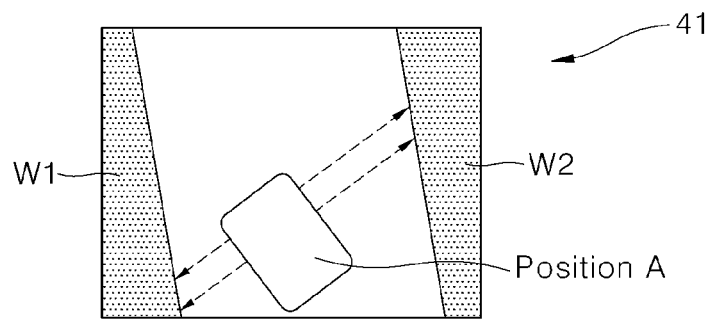
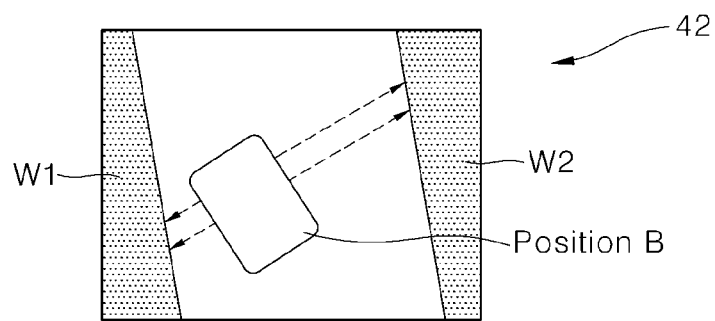
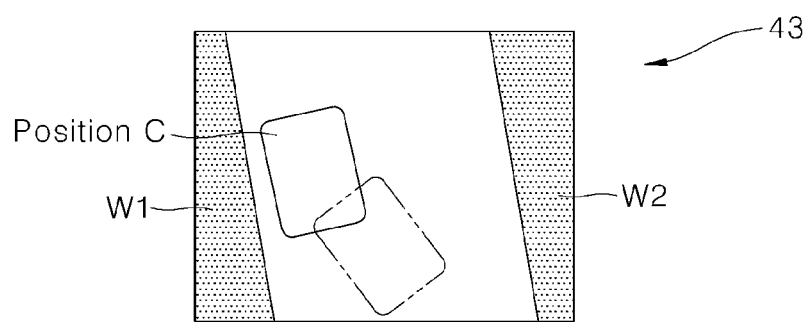

ROBOT STOPPING PARALLEL TO INSTALLED OBJECT AND METHOD OF STOPPING THE SAME

CROSS-REFERENCE TO RELATED APPLICATION

This application claims priority under 35 U.S.C. § 119 to and the benefit of PCT/KR2019/003182, filed on Mar. 19, 2019, and Korean Patent Application No. 10-2019-0119796, filed on Sep. 27, 2019, the disclosures of which are incorporated herein by reference in their entirety.

BACKGROUND

1. Technical Field

The present disclosure relates to a robot stopping parallel to an installed object and a method of stopping the same.

2. Related Art

In a space where human and material exchanges take place actively, for example, in a large supermarket, a department store, an airport, or a golf course, different people move with various articles carried. In this case, a type of robot, such as a cart loaded with articles, may assist a user in moving the articles in order to provide convenience for the user.

Conventionally, a user directly handles and moves a cart. However, the cart may be placed in the middle of an aisle while the user checks a variety of products in the space. In this situation, the user's control for the cart every time requires a lot of time and effort.

Accordingly, devices such as a cart are required to autonomously operate in order for a user to move freely for various activities. In particular, the cart should be moved while following the user without separate control by the user, or be moved using electrical energy under the control of the user. However, when a device such as the cart stops after moving autonomously or semi-autonomously, the stopped device may interfere with the passing of other devices or people. In particular, when the device stops obliquely in a space with many devices, the device may interfere with the movement of other devices. Therefore, there is a need for technology that efficiently stops a device such as a cart considering the specificity of the space provided with devices.

SUMMARY

The present disclosure has been made in view of the above-mentioned problems, and an object thereof is to increase movement efficiency of a plurality of robots in a space by controlling a robot to stop after moving parallel to an installed object, such as a wall or a stand, when it is intended to temporarily stop the robot.

It is another object of the present disclosure is to provide a method of allowing a robot to move and stop parallel and close to an installed object using spatial distance information detected by the robot, and a robot implementing the same.

It is a further object of the present disclosure to allow a robot to stop while remaining parallel in a space in order to avoid a collision with other robots and reduce in-space complexity.

The present disclosure is not limited to the above-mentioned objects, and other objects and advantages of the present disclosure can be understood by the following description and become apparent with reference to the embodiments of the present invention. Also, it is obvious to those skilled in the art to which the present disclosure pertains that the objects and advantages of the present disclosure can be realized by the means as claimed and combinations thereof.

In accordance with an aspect of the present disclosure, there is provided a robot stopping parallel to an installed object, the robot includes a controller configured to determine a pause state of the robot and move the robot such that, when an obstacle sensor calculates distances from obstacles, the robot is placed parallel and close to an adjacent one of installed objects disposed around the robot.

In the robot stopping parallel to an installed object according to the aspect of the present disclosure, the obstacle sensor may calculate a distance from an installed object disposed to the left from the robot and a distance from an installed object disposed to the right from the robot, and the controller may select an adjacent one of the left installed object and the right installed object and move the robot forward or backward to the selected installed object.

In the robot stopping parallel to an installed object according to the aspect of the present disclosure, the controller may compare the distances calculated by the obstacle sensors disposed toward the installed objects to control the moving direction of the robot.

In the robot stopping parallel to an installed object according to the aspect of the present disclosure, the controller may accumulate and store the distances calculated by the obstacle sensor and may calculate the position of an installed object by reflecting the accumulated and stored distances with respect to the moving route of the robot.

In accordance with another aspect of the present disclosure, there is provided a method of stopping a robot in parallel to an installed object, which includes detecting obstacles disposed around a robot by an obstacle sensor of the robot, determining a pause state of the robot by a controller of the robot, selecting, by controller, an adjacent one of installed objects, disposed around the robot, from among all of the obstacles disposed around the robot, based on the distances from the obstacles calculated by the obstacle sensor, generating, by the controller, a moving route of the robot such that the robot is placed parallel and close to the selected installed object, and moving, by a movement unit (i.e., motor assembly), the robot along the moving route.

BRIEF DESCRIPTION OF THE DRAWINGS

FIG. 4 illustrates a process in which the robot stops parallel to an installed object according to the embodiment of the present disclosure.

DETAILED DESCRIPTION

Figure 1:
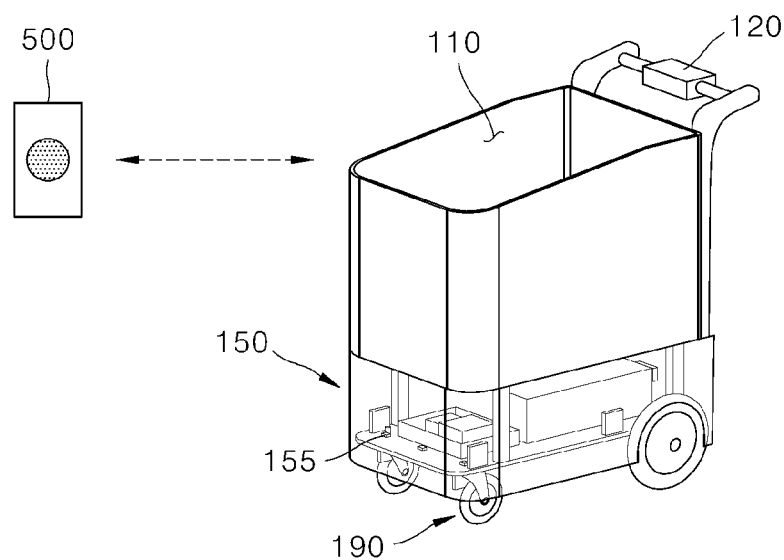
FIG. 1 illustrates an external appearance of a robot in the form of a cart according to an embodiment of the present disclosure.

Hereinafter, embodiments of the disclosure will be described in detail with reference to the accompanying drawings such that the disclosure can be easily implemented by those skilled in the art. The disclosure can be embodied in various forms and is not limited to the embodiments.

Parts which are not associated with description will be omitted in order to clearly describe the disclosure, and the same or similar elements over the entire specification will be referred to by the same reference signs. Some embodiments of the disclosure will be described in detail with reference to the accompanying drawings. In the drawings, the same elements will be referred to by as the same reference signs as possible. In the following description, when detailed description of the relevant known configurations or functions is determined to obscure the important point of the present disclosure, the detailed description will be omitted.

Terms such as first, second, A, B, (a), and (b) can be used to describe elements of the disclosure. These terms are merely used to distinguish one element from another element and the essence, order, sequence, number, or the like of the elements is not limited to the terms. If it is mentioned that an element is "coupled" or "connected" to another element, it should be understood that the element is directly coupled or connected to another element or still another element may "interposed" therebetween or the elements may be "coupled" or "connected" to each other with still another element interposed therebetween.

In embodying the disclosure, elements can be segmented and described for the purpose of convenience of explanation, these elements may be embodied in one device or module, or one element or may be divided and embodied into two or more devices or modules.

In the following description, devices that move autonomously to track users or move with electric energy under the control of users are referred to as a smart cart, a cart, or a robot. Hereinafter, a robot is described for the purpose of convenience of explanation. Robots can be used in shops such as large-scale marts or department stores, but are not limited thereto. Alternatively, robots can be used by users in spaces in which many people move, such as in airports or harbors. Robots can also be used in leisure spaces such as golf courses.

The robots include all devices that track a position of a user, follow the user, and has a predetermined storage space (e.g., a physical storage space for storing items). The robots include all devices that move using electric power under the control of a user such as pushing and pulling. As a result, a user can move a robot without requiring adjustment of the robot. A user can move the robot with a very small force.

Accordingly, examples of the robot include a device for transporting particular drugs or therapy equipment and a device such as a bed for transporting patients in a hospital. Besides, examples of the robot include a device for loading and moving products to transport them in a large factory.

Figure 2:
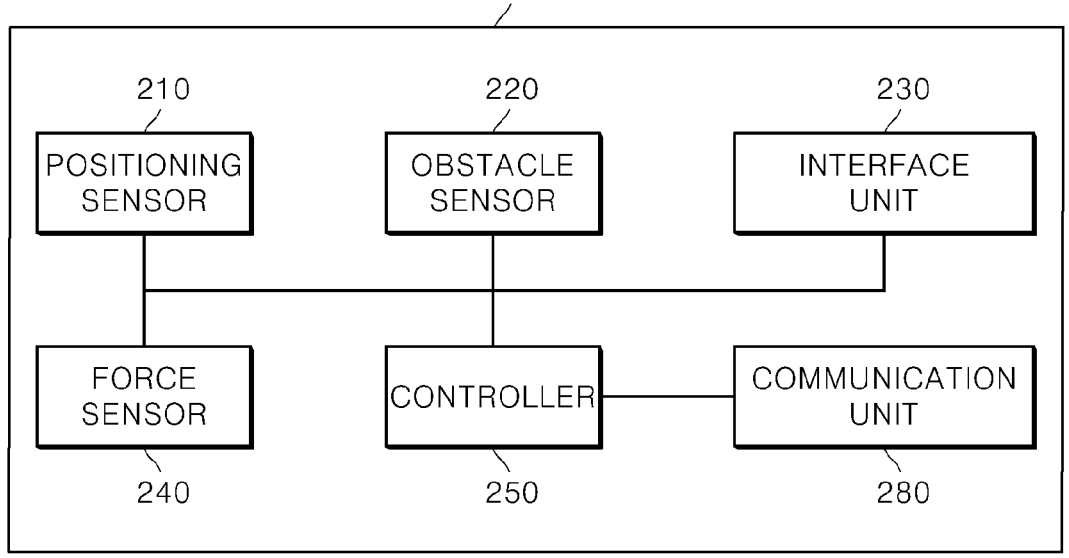
FIG. 2 illustrates components of a control module of the robot according to the embodiment of the present disclosure.

FIG. 1 illustrates an external appearance of a robot in the form of a cart according to an embodiment of the present disclosure. FIG. 2 illustrates components of a control module 150 of the robot according to the embodiment of the present disclosure.

A robot 100 includes a storage unit 110, a handle assembly 120, a control module 150, and movement units 190. The storage unit 110 is a space in which articles are stored or piled by a user. The handle assembly 120 enables a user to manually control movement of the robot 100 or to semi-automatically control movement of the robot 100.

A user can press the robot 100 forward and backward or change a direction thereof using the handle assembly 120. In this case, the robot 100 can travel semi-automatically using electric energy according to the magnitude of a force applied to the handle assembly 120 or a difference between a force applied to a right side of the handle assembly 120 and a force applied to a left side of the handle assembly 120.

The control module 150 controls movement of the robot 100. Particularly, the control module 150 controls autonomous traveling of the robot 100 to follow a user. The control module 150 controls semi-autonomous traveling (power assist) in which the robot 100 travels by assisting a user's force when the user pushes or pulls the robot 100 with a small force via the handle assembly 120.

The control module (e.g., controller) 150 may control the movement unit 190. Positioning sensors may be disposed in different regions of the robot 100 to track a user's position for following the user. Obstacle sensors may also be disposed in different regions of the robot 100 to detect an obstacle there around.

The obstacle sensor 220 senses an obstacle or a plurality of objects near the robot 100. The obstacle may be a person, a wall, an object, a fixed object, an installed object, or the like. The obstacle may also be a surface beyond a moving path of the robot, such as an edge of a cart path of a golf course, a lane marker beyond a predefined travelling area, or the like. The obstacle sensor 220 can sense a distance between the robot 100 and a person, a wall, an object, a fixed object, an installed object, an edge, a marker or the like. Alternatively, each obstacle sensor 220 may capture an image of an obstacle around the robot 100. The obstacle sensor 220 may be disposed at the lower end of the robot 100.

For example, a plurality of obstacle sensors 220 may be disposed in a part denoted by reference numeral 155 to sense an obstacle on front/rear/right/left sides from the robot 100. The obstacle sensors 220 are disposed at the same height position in the lower part of the robot 100. Alternatively, the obstacle sensors 220 may be disposed at two or more different height positions in the lower part of the robot 100. The obstacle sensors may be disposed on the front side and both lateral sides thereof in the direction in which the robot 100 moves. Alternatively, when the robot 100 moves in rearward direction, the obstacle sensors may be disposed on the front side, the rear side, and two lateral sides thereof.

The positioning sensor 210 is an element of the robot 100 that supports autonomous traveling. However, in a robot 100 that supports only semi-autonomous traveling (power assist), the positioning sensor 210 can be selectively disposed at various positions on the robot 100.

The positioning sensor 210 tracks a position of a user who carries a transmitter module 500 and is disposed on an upper side, a lateral side, or the like of the robot 100. However, the positions of these sensors 210, 220 can change and the disclosure is not limited thereto. Regardless of the positions of the sensors 210, 220, the controller 250 controls the sensors or uses information sensed by the sensors. That is, the sensors are logical elements of the control module 150 regardless of the physical positions thereof.

An interface unit 230 that outputs predetermined information to a user is disposed in the handle assembly 120, and the interface unit 230 is an element which is controlled by the control module 150. The handle assembly 120 includes the force sensor 240 that senses a force with which a user pushes or pulls the robot 100.

The force sensor 240 is disposed inside or outside the robot 100 which is subjected to change of a force by operation of the handle assembly 120. The position or configuration of the force sensor 240 is not particularly limited, and the disclosure is not limited to any specific force sensor 240.

FIG. 2 is a diagram illustrating a positioning sensor 210, a force sensor 240, an obstacle sensor 220, an interface unit 230, a controller 250, and a communication unit 280 which are logical elements of the control module 150.

The positioning sensor 210 receives a signal from the transmitter module 500 and measures the position of the transmitter module 500. When the positioning sensor 210 uses the ultra-wideband (UWB), a user can carry a transmitter module 500 that transmits a predetermined signal to the positioning sensor 210. The positioning sensor 210 can ascertain the position of the user on the basis of the position of the transmitter module 500. For example, the user may carry a transmitter module 500 of a band type which is worn on the user's wrist.

The force sensor 240 is disposed in the handle assembly 120 or is disposed inside or outside the robot 100 which is connected to the handle assembly 120. When a user applies a force to the handle assembly 120, the force sensor 240 senses the magnitude of the force, a change of the force, or the like. The force sensor 240 includes various sensors such as a Hall sensor, a magnetic type sensor, and a button type sensor. The force sensor 240 can be provided in plurality as a right force sensor and a left force sensor, in the handle assembly 120, inside or the outside the robot 100.

The obstacle sensor 220 senses an obstacle near the robot 100. The obstacle sensor 220 includes a sensor that measures a distance or acquires an image and ascertains one or more obstacles in the image. Exemplary embodiment of the obstacle sensor 220 that measures a distance includes an infrared sensor, an ultrasonic sensor, and a LIDAR sensor.

The obstacle sensor 220 includes a depth sensor or an RGB sensor. The RGB sensor can sense an obstacle and an installed object in an image. The depth sensor can calculate depth information for each position in an image.

The controller 250 cumulatively stores position information of a transmitter module 500 and generates a moving route corresponding to the store deposition information of the transmitter module 500. In order to cumulatively store the position information, the controller 250 can store the position information as absolute position information (absolute coordinates) based on a predetermined reference point.

Alternatively, the controller 250 may store the relative position information (relative coordinates) of the transmitter module 500 with respect to the robot 100 to check the pause state of the robot 100 based on the distance from the transmitter module 500. The pause state refers to a state in which the robot 100 temporarily stops because the user does not control the robot 100 or is around (e.g., located a predetermined distance from) the robot 100.

The controller 250 controls the moving direction or speed of the movement unit 190 according to the change or magnitude of force detected by the force sensor 240.

The controller 250 detects an installed object disposed around the robot 100 based on the value detected by each obstacle sensor 220. The controller 250 may check an installed object using the obstacle sensors 220 disposed on the side or/and front of the robot 100. In particular, the robot 100 may check the vertical plane of the installed object so as to be positioned parallel to the installed object.

The vertical plane of the installed object refers to an installed object's surface that is perpendicular to the floor where the installed object, such as a stand or a wall, is placed. For example, when the installed object is a wall, the vertical plane thereof refers to a wall surface. In addition, when the installed object is a stand, the vertical plane thereof refers to a plane formed by articles loaded on the stand, a side of the stand, or the like.

In an example, the vertical plane of the installed object is a vertical outline of the actual installed object. In an example, the vertical plane of the installed object is an imaginary plane that reflects portions protruding and recessed from the outer portion of the actual installed object. Similarly, "parallel" to the installed object includes an example in which one side of the robot 100 is parallel to the installed object or the center line of the robot 100 is parallel to the installed object. For example, when the robot 100 is rectangular in shape, the side of the robot 100 may be parallel to the installed object. On the other hand, when the robot 100 is elliptical in shape, the center line of the robot 100 may be parallel to the installed object.

The center line of the robot 100 may be set based on the direction in which the robot 100 travels straight. On the other hand, when the robot 100 has bilateral symmetry, the center line of the robot 100 may be a set of points centered from the left side and right side of the robot 100. Although the center line of the robot 100 is not indicated separately on the external appearance of the robot 100, the controller 250 may store information on the center line of the robot 100. The controller 250 may utilize the center line of the robot 100 as one criterion to determine whether the robot 100 is parallel to another installed object. That is, the controller 250 may stop the robot 100 in parallel to an installed object by determining whether the robot 100 is parallel to the installed object on the basis of the center line of the robot 100.

The controller 250 may stop the robot 100 in parallel to an installed object based on the detected vertical plane.

The controller 250 determines whether the robot 100 pauses in a power assist mode or in a following mode. The controller 250 generates the moving route of the robot 100 such that the robot 100 is placed parallel and close to an adjacent one of the installed objects arranged around the robot 100, based on the distance from the obstacle calculated by the obstacle sensor. That is, the controller 250 moves the robot 100 such that the robot 100 is placed in parallel to the obstacle. In an example, the movement of the robot 100 means that a moving route is generated and the robot 100 is moved by the movement unit 190 thereof.

The movement unit 190 moves the robot 100 along a moving route which his generated by a controller 250. The movement unit 190 can move the robot 100 by rotating wheel(s) of the movement unit 190. In movement of the robot 100 by the movement unit 190, the controller 250 can ascertain the position of the robot 100 on the basis of the rotation speed of the wheels, the number of rotations of the wheels, and the direction of the wheels. The moving route which is generated by the controller 250 includes angular velocities which are applied to the right wheel(s) and the left wheel(s) of the robot 100.

In the embodiment of FIGS. 1 and 2, the robot 100 follows the transmitter module 500 based on the position information of the transmitter module 500.

The communication unit 280 functions to remotely upgrade the software of the control module 150 or to receive the position information of the transmitter module 500 from the outside if the positioning sensor 210 fails to measure the position of the transmitter module 500.

The interface unit 230 may output a predetermined advertisement, and the communication unit 280 may receive information, such as an advertisement or a message, to be output to the interface unit 230. The communication unit 280 may facilitate payment in an unmanned store by transmitting the information of the product stored in the storage unit 110 to an external server.

Each obstacle sensor 220 checks the position of an installed object in the space where the robot moves. For example, when the obstacle sensor 220 is a LIDAR sensor or a distance sensor, it may detect the vertical plane of an installed object disposed outside. The installed object may a wall, an in-store product display stand (stand), or the like.

The installed object is disposed approximately vertically or vertically in a space. Accordingly, when the obstacle sensors 220 disposed on one surface of the robot 100 detect an installed object, the distance to the installed object therefrom may be constantly increased or decreased or may have a certain value. The controller 250 may stop the robot 100 in parallel to the installed object based on the distance value detected by two or more obstacle sensors 220.

Hereinafter, the mode in which the robot 100 autonomously travels to follow the user by measuring the position of the transmitter module 500 using the positioning sensor 210 is referred to as a following mode. On the other hand, the mode in which the robot 100 semi-autonomously travels by detecting the force, applied to the handle assembly 120 of the robot 100, using the force sensor 240 is referred to as a power assist mode.

The power assist mode refers to a mode functioning as a type of power handle that moves the robot 100 with a force greater than the force applied to the handle assembly 120 by the user. In the power assist mode, the controller 250 determines the moving direction or speed of the robot 100, in response to the force detected by the force sensor 240, to move the movement unit 190 based thereon.

In the specification, a technique is proposed in which the robot 100 stops parallel and close to an installed object when temporarily stopping while moving in the following mode or power assist mode. In addition, after the robot 100 is disposed obliquely or far away from an installed object, the control module 150 of the robot 100 may move the robot 100 by determining whether the robot 100 is disposed in parallel to the installed object.

In the power assist mode, the user may temporarily not control the robot 100, while generally at other times the user may control the robot 100. In this case, the robot 100 according to the configuration of FIGS. 1 and 2 moves and stops in parallel to an installed object such as a stand or a wall.

On the other hand, when the user temporarily does not move close to the robot 100 while the robot 100 moves to follow the user in the following mode, the robot 100 according to the configuration of FIGS. 1 and 2, moves and stops in parallel to an installed object, such as a stand or a wall.

Figure 3:
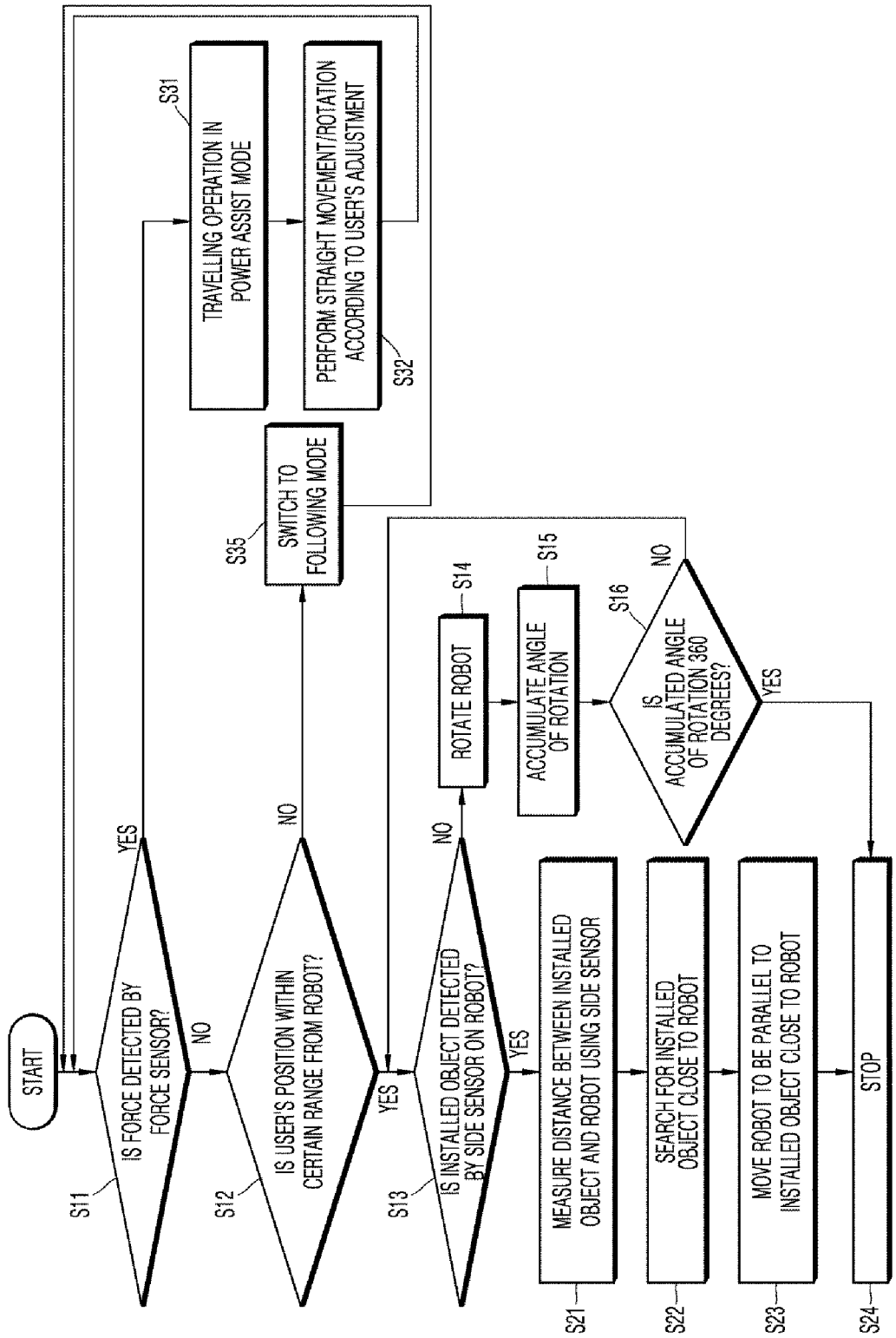
FIG. 3 illustrates a process in which the robot stops in parallel in a power assist mode according to the embodiment of the present disclosure.

FIG. 3 illustrates a process in which the robot 100 stops in parallel while in the power assist mode according to the embodiment of the present disclosure. The power assist mode is one of two states, including a travelling state and a standby state. The travelling state is a state in which, when a user's force, such as pushing or pulling, is input to the handle assembly 120, the force sensor 240 detects the user's force to control the motor for driving the movement unit 190 so that the robot 100 travels according to the intention of the user. It may be called a power-assist-mode travelling state or a travelling mode for short.

On the other hand, the standby state is a state that the robot 100 waits when a user's force such as pushing or pulling is not input to the handle assembly 120 for a certain time. It may be called a power-assist-mode standby state or a standby mode for short. When the force is not detected by the force sensor 240, the controller 250 may stop the robot 100 in parallel to an installed object by determining whether the robot 100 pauses.

In the standby state, when the robot 100 detects an obstacle there around using the obstacle sensors 220 mounted on the side thereof and the obstacle is then checked to be an installed object, the robot 100 moves and then stops parallel to the installed object.

The force sensor 240 detects a force (S11). The force sensor 240 detects the force when the handle assembly 120 is pushed or pulled by hand. Thus, the robot 100 operates to travel in the power assist mode when the force is detected (S31). The robot 100 performs an action such as straight movement or rotation according to the user's adjustment (the magnitude of or the difference in force applied to left hand side of the handle assembly 120 and right hand side of the handle assembly 120) (S32). The force sensor 240 continues to check whether the force is detected.

On the other hand, no detection of the force by the force sensor 240 means that the user takes his/her hand off the handle assembly 120 of the robot 100. The positioning sensor 210 measures a user's position. The positioning sensor 210 receives a signal from the transmitter module 500 to measure the position of the transmitter module 500.

The controller 250 checks, from the result of measurement, whether the user's position (the position of the transmitter module 500) is within a certain distance or range (predetermined distance) from the robot 100 (S12). If the user is away from the robot 100 by a certain distance (1 meter or 2 meters, or the like) or more, the controller 250 determines that the robot 100 is in a pause state. The controller 250 switches the mode of the robot 100 to the following mode and controls the robot to move along with the user (S35).

On the other hand, if the user's position is within the certain range (certain distance) from the robot 100, the controller 250 checks the distance or direction between the robot 100 and an installed object to stop the robot 100 in parallel to the installed object. To this end, the controller 250 checks whether an installed object, such as a stand or a wall, is detected by the obstacle sensors 220 disposed on the side of the robot 100 (S13).

If the installed object is not detected by the side obstacle sensors 220, the controller 250 rotates the robot 100 (S14). The controller 250 accumulates and stores an angle of rotation when the robot 100 rotates in one direction (S15). If the accumulated angle of rotation exceeds 360 degrees (S16), the controller 250 determines that the installed object is not detected, thereby stopping the robot 100 (S24).

On the other hand, if the angle of rotation is not 360 degrees, the robot 100 rotates little by little (e.g., slowly) in one direction and the controller 250 checks whether an installed object, such as a stand or a wall, is detected by the obstacle sensors 220 disposed on the side of the robot 100 (S13).

When it is checked that the installed object is detected, the controller 250 measures the distance between the installed object and the robot 100 using the side obstacle sensors 220 (S21). When the distances measured by the left and right obstacle sensors 220 are calculated, the controller 250 searches for a near one of the left and right installed objects (S22).

The controller 250 moves the robot 100 so that the robot 100 is parallel to and close to (adjacent to) the installed object on the side (left or right) of the robot 100 (S23). When the robot 100 is parallel to and adjacent to the installed object, the controller 250 stops the robot 100 (S24).

In the case where the robot 100 does not support the following mode in FIG. 3, the controller 250 may skip step S12 and proceed to step S13 if a force is not detected by the force sensor 240 after step S11, to stop the robot 100 in parallel to the object. In FIG. 3, reference numeral S11 or S12 is a step in which the controller 250 determines whether the robot 100 is in a pause state.

FIG. 4 illustrates a process in which the robot 100 stops parallel to an installed object according to the embodiment of the present disclosure. The robot 100 moves based on the flowchart illustrated in FIG. 3.

FIG. 4 illustrates that both sides of the robot 100 are parallel to each other for convenience of description. However, the present invention is not limited thereto. The robot 100 may stop parallel to an installed object even though both sides of the robot are not parallel to each other and the robot 100 is triangular or trapezoidal in shape. The criterion that the triangular or trapezoidal robot 100 stops in parallel includes an example in which one side of the robot is parallel to the installed object or the center line of the robot 100 is parallel to the installed object. In addition, when the robot 100 is elliptical in shape, the robot 100 may stop parallel to the installed object using information on the center line of the robot 100. A description thereof will be given later.

A robot 100 is disposed between two installed objects W1 and W2 at positions A, B or C. As indicated by reference numeral 41, the robot 100 is at position A between the two installed objects. When the user takes his/her hand off the handle assembly of the robot 100 when the robot 100 is at position A, the force sensor 240 does not detect the user's force. When a parallel stop is required, the controller 250 measures the distances between the left and right installed objects W1 and W2 and the robot 100 using both obstacle sensors 220.

The controller 250 determines that the left installed object and the robot 100 are close to each other. As indicated by reference numeral 42, the controller 250 moves the robot 100 to position B, in which the robot 100 is moved straight to be closer to the left installed object W1.

When the left installed object and the robot 100 are close enough to each other (when the distance therebetween is a predetermined reference or less), the controller 250 rotates the robot 100 to dispose the robot 100 in parallel to the installed object W1 to position C. This is indicated by reference numeral 43. The dotted line at reference numeral 43 refers to the position A of the robot 100 at reference numeral 41.

The process in FIG. 4 is summarized as follows. The obstacle sensors 220 calculate the distance between the robot 100 and the installed object disposed on the left side therefrom and the distance between the robot 100 and the installed object disposed on the right side therefrom. The controller 250 selects an adjacent one of the left and right installed objects. Then, the controller 250 controls the movement unit 190 to move forward or backward to the installed object selected by the robot 100.

Figure 5:
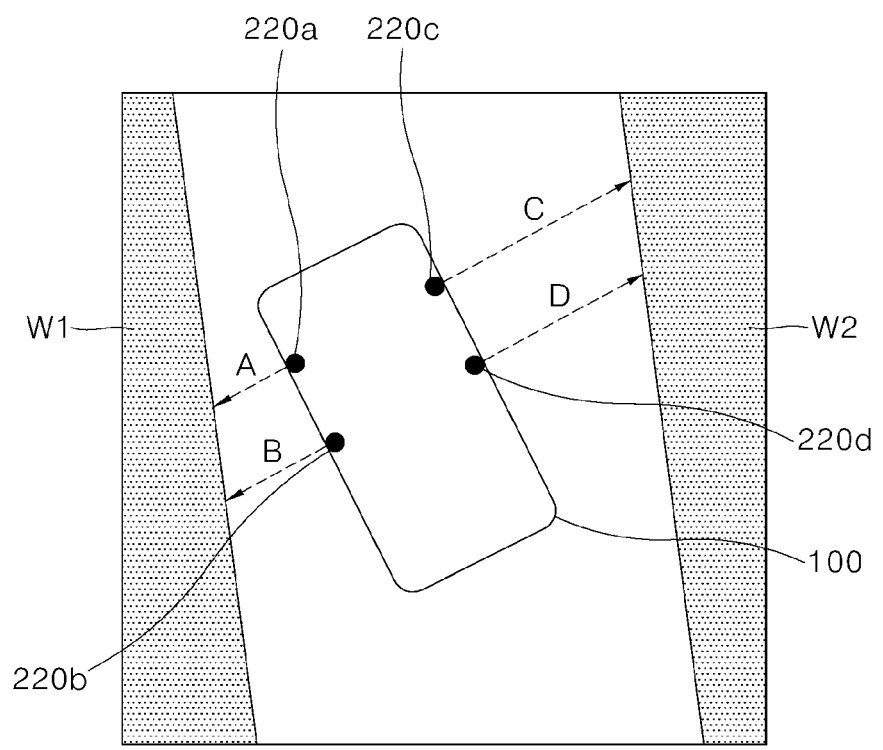
FIG. 5 illustrates a process in which the robot stops parallel to an installed object using obstacle sensors disposed on the side of the robot according to the embodiment of the present disclosure.
Figure 6:
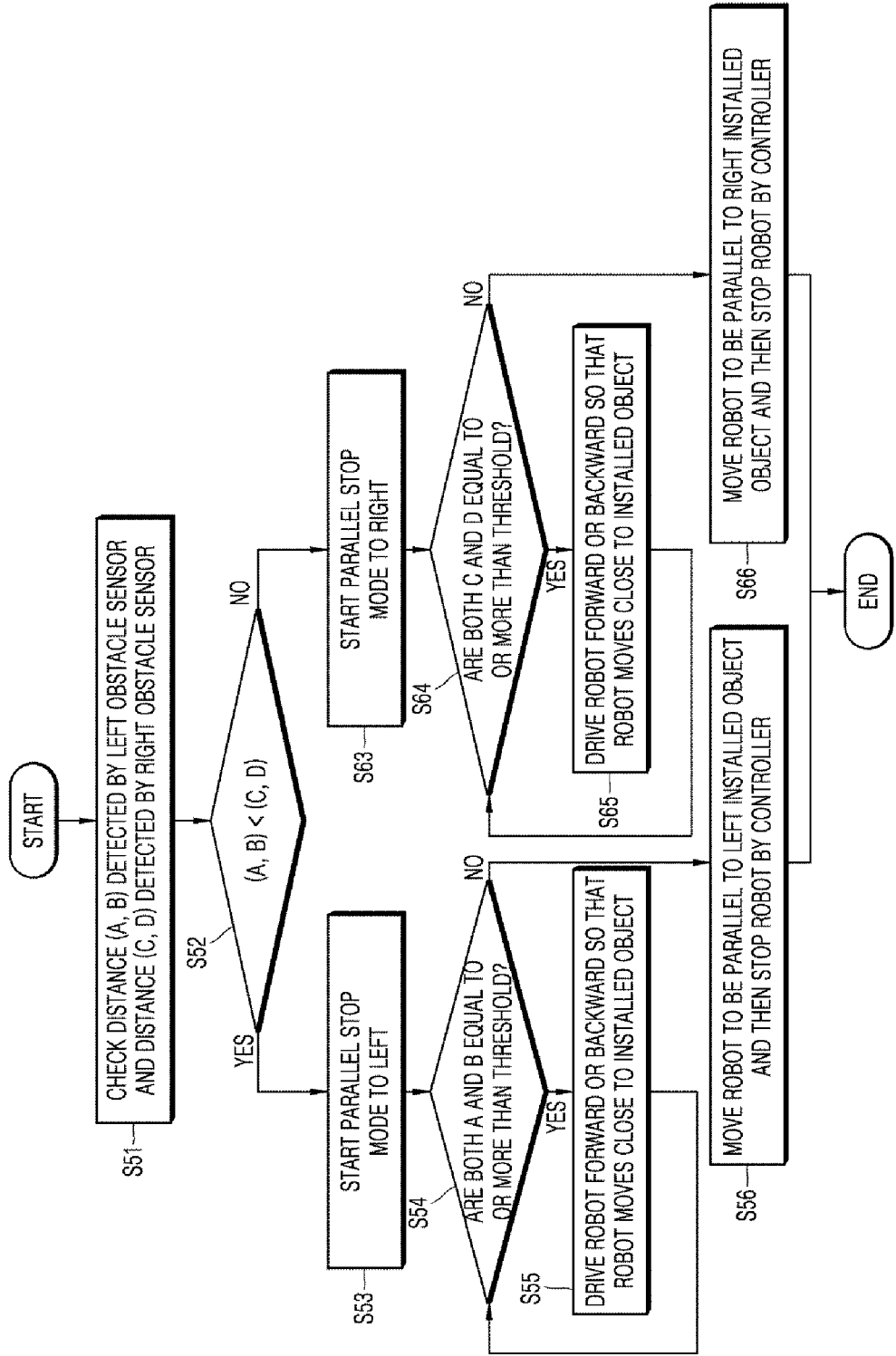
FIG. 6 illustrates a detailed process in which a controller searches for installed objects to the left and to the right of the robot to stop the robot in parallel to either of the installed objects.

FIGS. 5 and 6 illustrate a process in which the robot 100 stops parallel to an installed object using obstacle sensors 220a, 220b, 220c, 220d disposed on the sides of the robot 100 according to the embodiment of the present disclosure. The obstacle sensors 220a, 220b, 220c, 220d may be spaced apart from one another and located on different sides from one another. The controller 250 of the robot 100 compares distances detected in lateral directions by two or more obstacle sensors 220a, 220b, 220c, 220d for distance measurement. The controller 250 moves the robot 100 to be positioned close and parallel to an installed object.

FIG. 5 illustrates a configuration in which four side obstacle sensors 220a, 220b, 220c, and 220d are disposed on the side of the robot 100. Of course, a plurality of obstacle sensors 220a, 220b, 220c, 220d may be disposed on the side, front, rear, and the like of the robot 100, and the present disclosure is not limited to the number of obstacle sensors 200 (i.e., the robot 100 may have any number of obstacle sensors 200, which may depend on the size and shape of the robot 100).

Reference numeral A refers to a distance to a left obstacle detected by the left front obstacle sensor 220a. Reference numeral B refers to a distance to the left obstacle detected by the left rear obstacle sensor 220b. Reference numeral C refers to a distance to a right obstacle detected by the right front obstacle sensor 220c. Reference numeral D refers to a distance to the right obstacle detected by the right rear obstacle sensor 220d.

The controller 250 may check the distance between the robot 100 and the installed object based on the difference between "A", "B", "C", and "D".

FIG. 6 illustrates a detailed process in which the controller searches for left and right installed objects to stop the robot 100 in parallel to either of the installed objects. FIG. 6 illustrates a detailed implementation of processes S21, S22, and S23 of FIG. 3. Referring to FIG. 5, the controller 250 checks the distances A and B detected by the left obstacle sensors 220a and 220b and the distances C and D detected by the right obstacle sensors 220c and 220d (S51) to compare them (S52).

The controller 250 may compare the front two measured values A and C and compare the rear two measured values B and D. Alternatively, the controller 250 may select a minimum one of the left two measured values A and B and a minimum one of the right two measured values C and D, to compare the two minimum values. That is, the controller determines the minimum value among A and B, and the minimum value among C and D, and determines which obstacle to place the robot 100 in parallel to, based on this determined value. The determined obstacle may be closest to the robot 100.

When it is determined that the robot 100 is close to the left installed object as a result of the comparison, the controller 250 performs steps S53 to S56. On the contrary, when it is determined that the robot 100 is close to the right installed object as a result of the comparison, the controller 250 performs steps S63 to S66.

Steps S53 to S56 will be described in which the controller 250 moves the robot 100 in parallel to the left installed object. In steps S53 to S56, the obstacle sensors 220*a*, 220*b*, 220*c*, 220*d* measure a distance from an obstacle in real time.

The controller 250 starts a parallel stop mode to stop the robot 100 in parallel to the left installed object W1 (S53). First, the controller 250 checks whether both the A and B values (distance values) are equal to or more than a threshold th (S54). The threshold th means a distance that the robot 100 must approach the installed object for parallel stop.

Therefore, when both the values A and B are equal to or more than the threshold th, the controller 250 moves in a closer direction (in a forward or backward direction) to be close to the installed object (S55). The obstacle sensors 220*a*, 220*b*, 220*c*, 220*d* continue to measure the distance from the installed object even during movement to check whether one of the distance values A and B is less than or equal to the threshold th (S54).

When one of the values A and B is less than or equal to the threshold th in step S54, the controller 250 moves the robot 100 to be parallel to the left installed object, and then stops the robot 100 since the robot 100 is close enough to the left installed object W1 (S56).

Steps S63 to S66 will be described in which the controller 250 moves the robot 100 in parallel to the right installed object. In steps S63 to S66, the obstacle sensors 220*a*, 220*b*, 220*c*, 220*d* measure a distance from an obstacle in real time.

The controller 250 starts a parallel stop mode to stop the robot 100 in parallel to the right installed object W2 (S63). First, the controller 250 checks whether both the C and D values (distance values) are equal to or more than a threshold th (S64). The threshold th means a distance that the robot 100 must approach the installed object for parallel stop.

Therefore, when both the values C and D are equal to or more than the threshold th, the controller 250 moves in a closer direction (in a forward or backward direction) to be close to the installed object (S65). The obstacle sensors 220*a*, 220*b*, 220*c*, 220*d* continue to measure the distance from the installed object even during movement to check whether one of the distance values C and D is less than or equal to the threshold th (S64).

When one of the values C and D is less than or equal to the threshold th in step S64, the controller 250 moves the robot 100 to be parallel to the right installed object, and then stops the robot 100 since the robot 100 is close enough to the right installed object W2 (S66).

Step S55 of FIG. 6 may be implemented with the following pseudo code:

```
[S55 Pseudo Code]
if (A > th) and (B > th) and (A > B)
    then, backward movement of robot 100 until
B is less than or equal to th
    if (A > th) and (B > th) and (A < B)
        then, forward movement of robot 100 until
A is less than or equal to th.
```

Step S65 of FIG. 6 may be implemented by applying C and D instead of A and B, respectively, as follows:

```
[S65 Pseudo Code]
if (C > th) and (D > th) and (C > D)
    then, backward movement of robot 100 until
B is less than or equal to th
    if (C > th) and (D > th) and (C < D)
        then, forward movement of robot 100 until
C is less than or equal to th.
```

Step S56 of FIG. 6 may be implemented with the following pseudo code:

```
[S56 Pseudo Code]
if (A > B)
    then counterclockwise rotation
else if (A < B)
    then clockwise rotation
else if (A = B)
    then stop of rotation.
```

Step S66 of FIG. 6 may be implemented with the following pseudo code:

```
[S66 Pseudo Code]
if (C > D)
    then clockwise rotation
else if (C < D)
    then counterclockwise rotation
else if (C = D)
    then stop of rotation.
```

In an example, the controller 250 increases a motor value applied to the left wheel of the movement unit 190 and decreases a motor value applied to the right wheel of the movement unit 190, for the clockwise rotation of the robot 100.

In an example, the controller 250 decreases a motor value applied to the left wheel of the movement unit 190 and increases a motor value applied to the right wheel of the movement unit 190, for the counterclockwise rotation of the robot 100.

In FIG. 6, when the value detected by each obstacle sensor 220*a*, 220*b*, 220*c*, 220*d* (the distance from the obstacle) is large, the obstacle is positioned far away. On the contrary, when the value detected by one of the obstacle sensors 220*a*, 220*b*, 220*c*, 220*d* is small, the obstacle is positioned nearby.

In the case where any obstacle is not detected at all due to the distance from the obstacle, the robot 100 may rotate in place when the same angular velocity is applied in reverse to motors connected to the left and right wheels of the movement unit 190. Alternatively, the robot 100 may rotate, instead of moving straight and backward to approach the obstacle identified as an installed object.

For example, the robot 100 may move straight to approach the obstacle identified as an installed object. In this case, when an obstacle is detected in front of the robot 100, the robot 100 may only rotate without moving straight. When the robot 100 is far away from the user at the time of rotation, it may move backward. When the robot 100 is too close to the user during backward movement, it only rotates without moving backward.

The process in FIGS. 5 and 6 is summarized as follows. Two or more obstacle sensors 220*a*, 220*b*, 220*c*, 220*d* are disposed on each of the left and right sides of the robot 100. The controller 250 checks whether the robot 100 is parallel to an installed object based on the values detected by the two or more obstacle sensors 220a, 220b, 220c, 220d disposed on the side of the robot 100.

In FIG. 5, the controller 250 checks whether the robot 100 is parallel to the left obstacle object W1 based on the values A and B. In FIG. 5, the controller 250 checks whether the robot 100 is parallel to the right obstacle object W2 based on the values C and D.

That is, the controller 250 controls the direction of the movement unit 190 by comparing the distances calculated by the two obstacle sensors (e.g., the left obstacle sensors 220a and 220b, or the right obstacle sensors 220c and 220d) disposed toward an adjacent one selected from the installed objects (S56 or S66).

In FIGS. 5 and 6, the controller 250 continues to check the distance from the user in the process of approaching an installed object. The controller 250 may check the distance from the user in such a manner that the positioning sensor 210 repeatedly checks the position of the transmitter module 500. As a result, when the distance from the user increases, the robot 100 may move close and parallel to an installed object by rotating instead of moving straight or backward.

Figure 7:
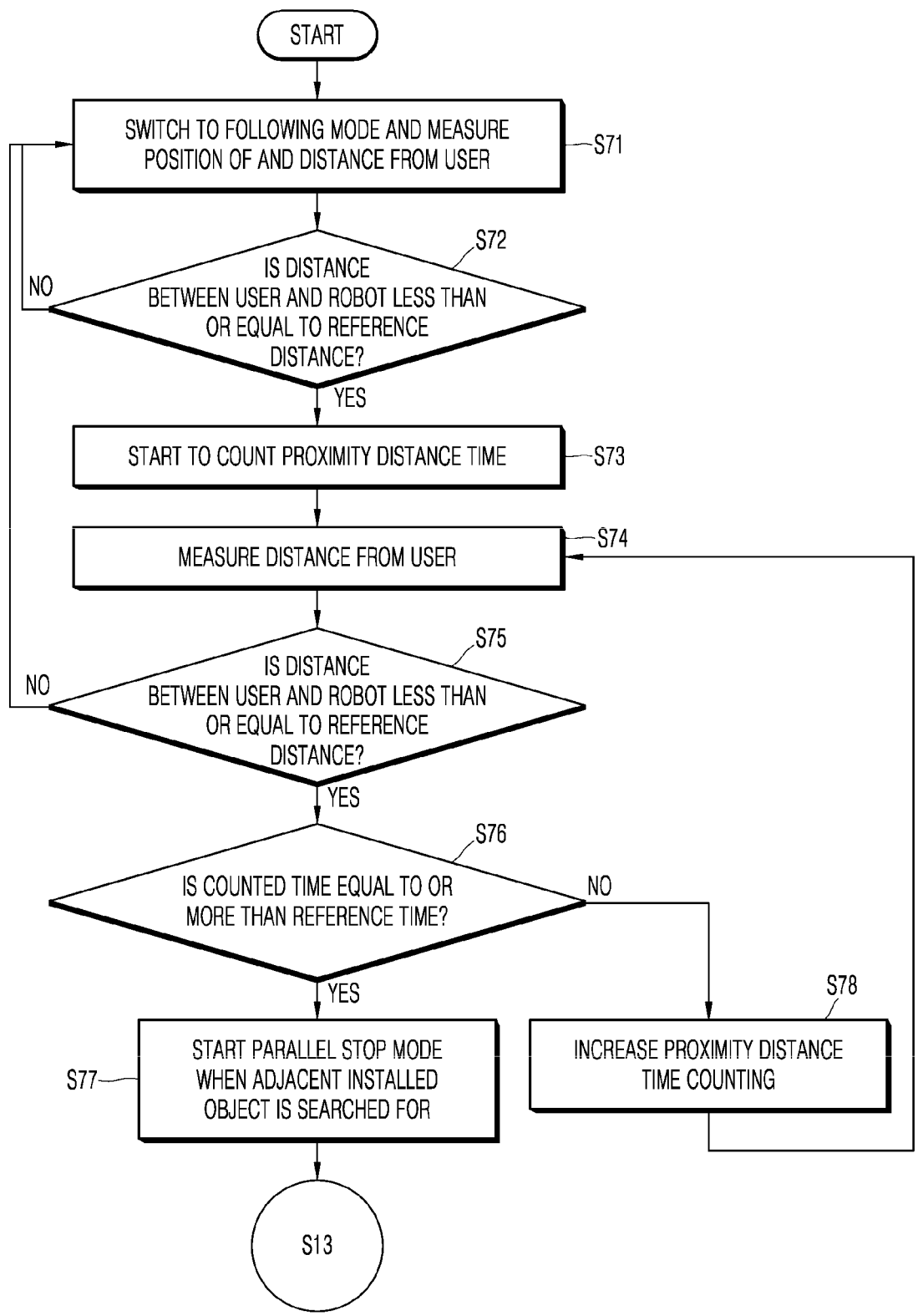
FIG. 7 illustrates a process in which the robot stops in parallel in a following mode according to the embodiment of the present disclosure.

FIG. 7 illustrates a process in which the robot 100 stops in parallel in the following mode according to the embodiment of the present disclosure.

The following mode is of two states, a following travelling state and a proximity standby state. The following travelling state is a state in which, when the user and the robot 100 are spaced apart from each other by a certain distance or more, the robot 100 moves to follow the user. On the other hand, the proximity standby state is a state in which, when the user and the robot 100 are close to each other, the robot 100 waits in proximity to the user without moving.

In FIG. 7, when the user is in the vicinity of the robot 100 for a certain period of time in the following mode in which the robot 100 moves along with the user by measuring the position of and distance from the user, the robot 100 expects that the user will perform other tasks in the vicinity of the robot 100. The robot 100 may start a parallel stop mode by searching for an adjacent installed object.

The mode of the robot 100 switches to the following mode and the robot 100 measures the position of and distance from the user (S71). Here, the position of and distance from the user are results obtained by the positioning sensor 210 measuring the transmitter module 500. The controller 250 checks whether the distance between the user (i.e., via the transmitter module 500) and the robot 100 is less than or equal to a reference distance (e.g., 1 m) (S72). When the distance is equal to or more than the reference distance, the robot 100 performs step S71.

When the distance is less than or equal to the reference distance, that is, when the robot 100 and the user are close to each other, the controller 250 counts the time when the robot 100 and the user are close to each other. To this end, the controller 250 starts to count a proximity distance time (S73).

When the positioning sensor 210 measures the distance from the user (S74), the controller 250 checks whether the distance between the user and the robot 100 is still less than or equal to the reference distance (S75). If the distance is equal to or more than the reference distance, the robot 100 performs step S71 since the user has moved.

When the distance between the user and the robot 100 is less than or equal to the reference distance in step S75, the controller 250 checks whether the counted time is more than or equal to a reference time (e.g., 30 seconds). If the robot 100 is close to the user for a certain time or more, the controller 250 searches for an adjacent installed object and starts a parallel stop mode (S77).

Here, the adjacent installed object refers to an installed object disposed close to the robot 100. For example, when an installed object close to the robot 100 within 1 meter or less is searched for, the robot 100 performs step S13 of FIG. 3 to move and stop close and parallel to the installed object.

On the other hand, when the counted time is less than or equal to the reference time in step S76, the process increases the proximity distance time counting (S78) and proceeds to step S74.

Summarizing the process in FIG. 7, in the following mode, the controller 250 determines that the robot 100 pauses when the distance between the transmitter module and the robot 100 is less than or equal to a certain distance. The controller 250 stops the robot 100 in parallel to the installed object.

Figure 8:
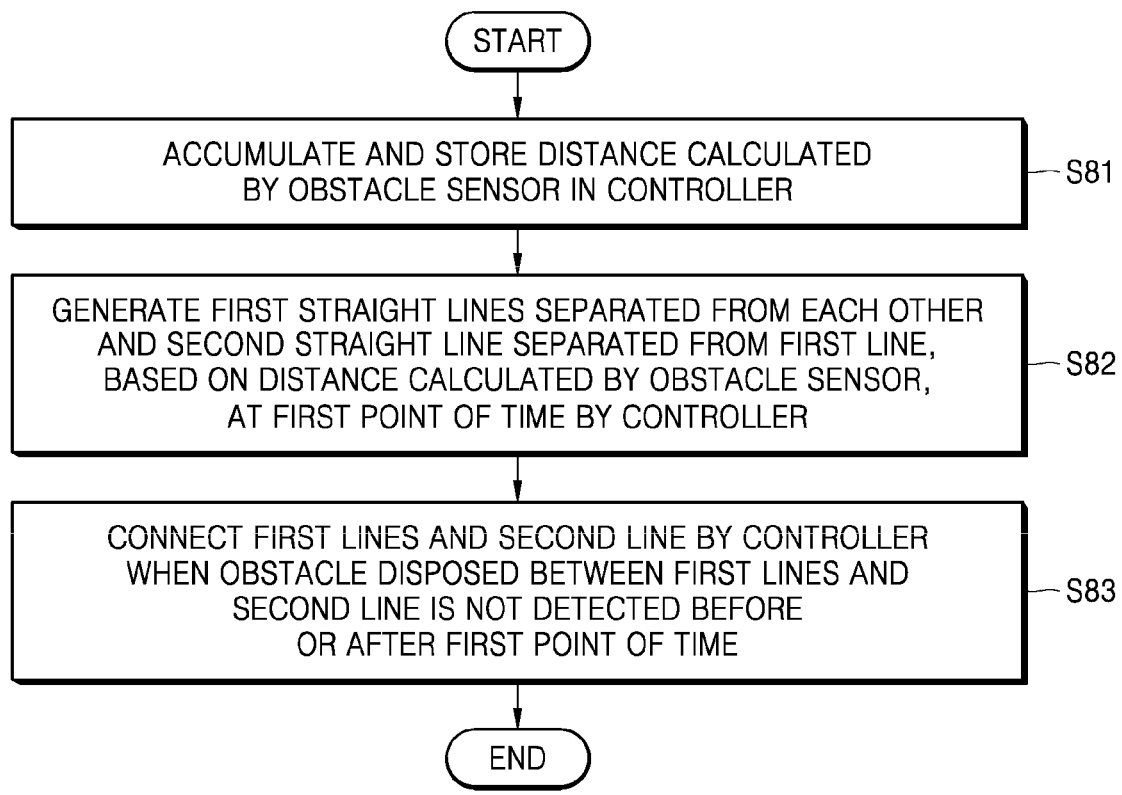
FIGS. 8 to 10 illustrate a process of calculating and storing a position of an installed object according to the embodiment of the present disclosure.
Figure 9:
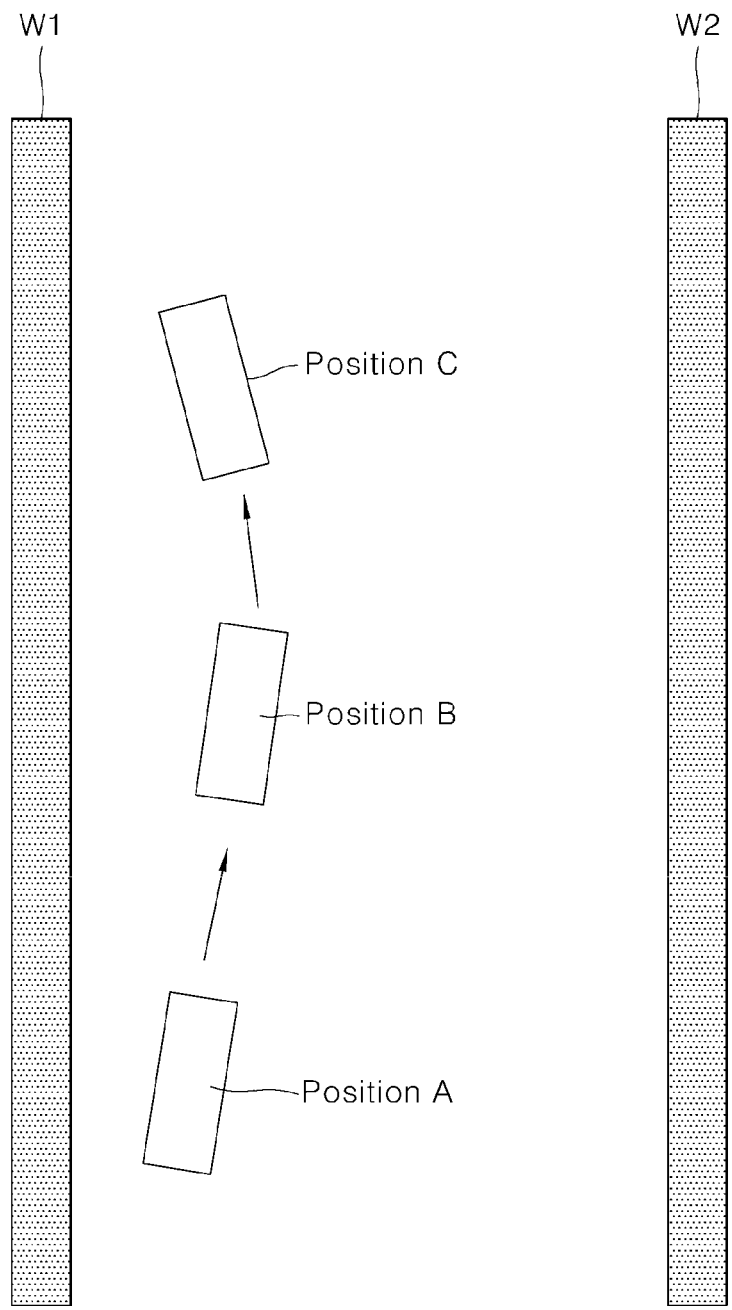
Figure 10:
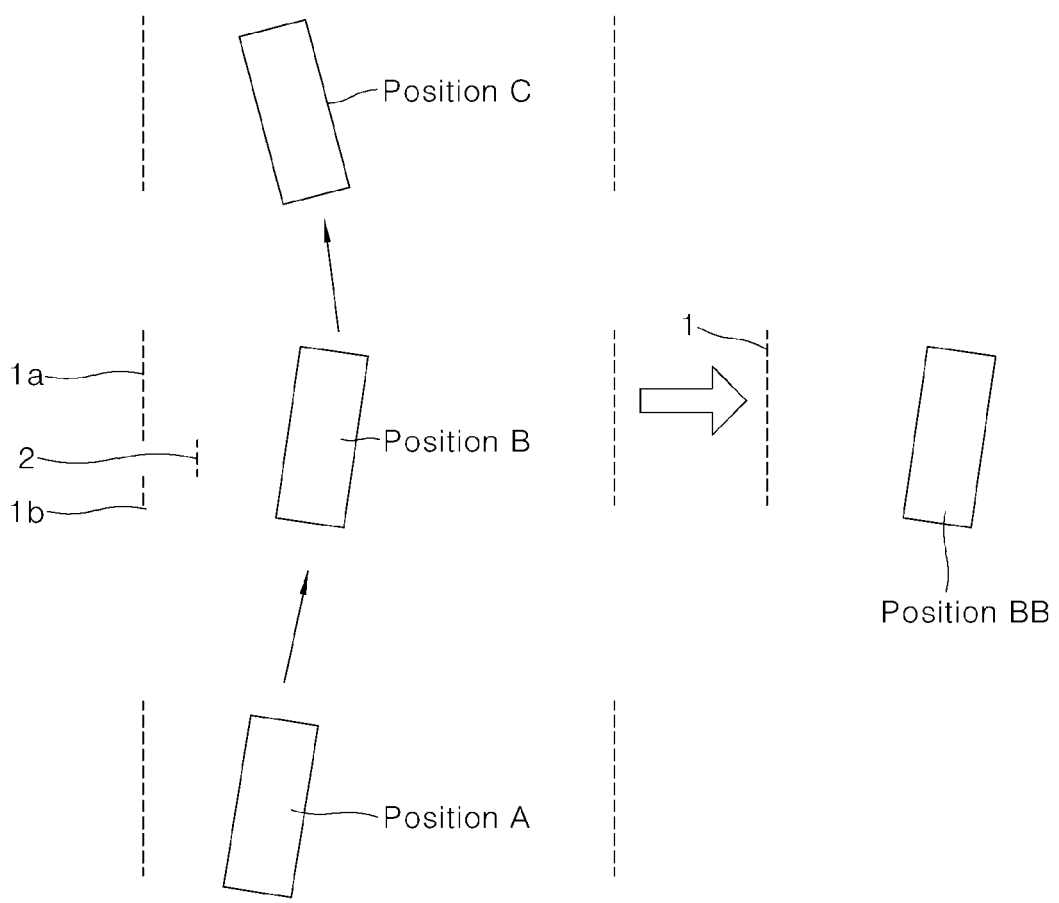

FIGS. 8 to 10 illustrate a process of calculating and storing a position of an installed object according to the embodiment of the present disclosure.

The embodiment of FIGS. 8 to 10 is applicable to a situation in which, in the process where the obstacle sensors 220 detect an installed object, another obstacle is detected or articles protrude and are arranged on a display stand.

The controller 250 accumulates and stores the distances calculated by the obstacle sensors 220 (S81). Such information is to check the distances from the robot 100 to left and right obstacles. FIG. 9 illustrates a trajectory along which the robot 100 moves, which is indicated by position A, position B and position C. Two installed objects W1 and W2 are disposed on the left side and right side from the robot 100 at positions A, B or C. Each dotted line of FIG. 10 indicates a distance calculated by each obstacle sensor 220 detecting an obstacle at each robot 100 position of FIG. 9. The dotted lines of FIG. 10 indicate the positions of obstacles.

When obstacles are detected in a straight line, these obstacles are highly likely to be installed objects.

Referring to FIG. 10, at the robot 100 positions, such as position A and position B, single straight lines on both left and right sides from the robot 100 are indicated by dotted lines. The dotted lines indicate positions at which obstacles are detected. On the other hand, when the distances from which left obstacles are detected are accumulated and indicated at the robot 100 position such as reference numeral 100b, the outlines formed by the obstacles consist of a first line indicated by reference numeral 1a, a second line indicated by reference numeral 2, and a third line indicated by reference numeral 1b.

The controller 250 calculates the position of an installed object by reflecting the accumulated and stored distances with respect to the moving route of the robot 100 (S82 and S83). In more detail, the controller 250 generates first straight lines that are not separated from each other (i.e., may be in a same plane) and a second straight line separated from the first line (i.e., in a separate plane from the first straight lines), based on the distance calculated by each obstacle sensor 220, at a first point of time (S82). In an example, three separated lines 1a, 2, and 1b are disposed on the left side from the robot 100 position B of FIG. 9.

However, before the robot 100, when at position B, detects the obstacle indicated by reference numeral "2", the robot 100, when at position A does not detect a separate obstacle on the left side therefrom. Similarly, after the robot 100, when at position B, detects the obstacle indicated by "2", the robot 100, when at position C, does not detect a separate obstacle on the left side therefrom.

Thus, the obstacle indicated by "a2" is highly likely to be a temporarily detected obstacle. Accordingly, when the obstacle disposed between the first lines 1*a* and 1*b* and the second line 2 is not detected before or after the first point of time, the controller 250 connects the first lines and the second line. This is the same as the position of the robot 100 indicated by position BB and one single straight line indicated by reference numeral 1 on the left side therefrom.

Moreover, when the obstacle indicated by "2" in FIG. 10 is checked even at the positions A and C, the controller 250 identifies the region indicated by "2" as a protruding obstacle. As a result, one straight line such as reference numeral B may be calculated by extending lines 1*a* and 1*b*.

As illustrated in FIGS. 8 to 10, when position information on the obstacles detected by the obstacle sensors 220 is accumulated and stored, the controller 250 may check the vertical plane of an installed object except for temporarily detected obstacles or some protruding obstacles. As a result, when the robot 100 pauses, the controller 250 may stop the robot 100 after moving the robot 100 in parallel to an adjacent installed object.

In addition, when the obstacle sensors 220 are disposed at different heights, the controller 250 may combine positions of obstacles detected for each height to check whether the obstacles are installed objects or movable obstacles.

Figure 11:
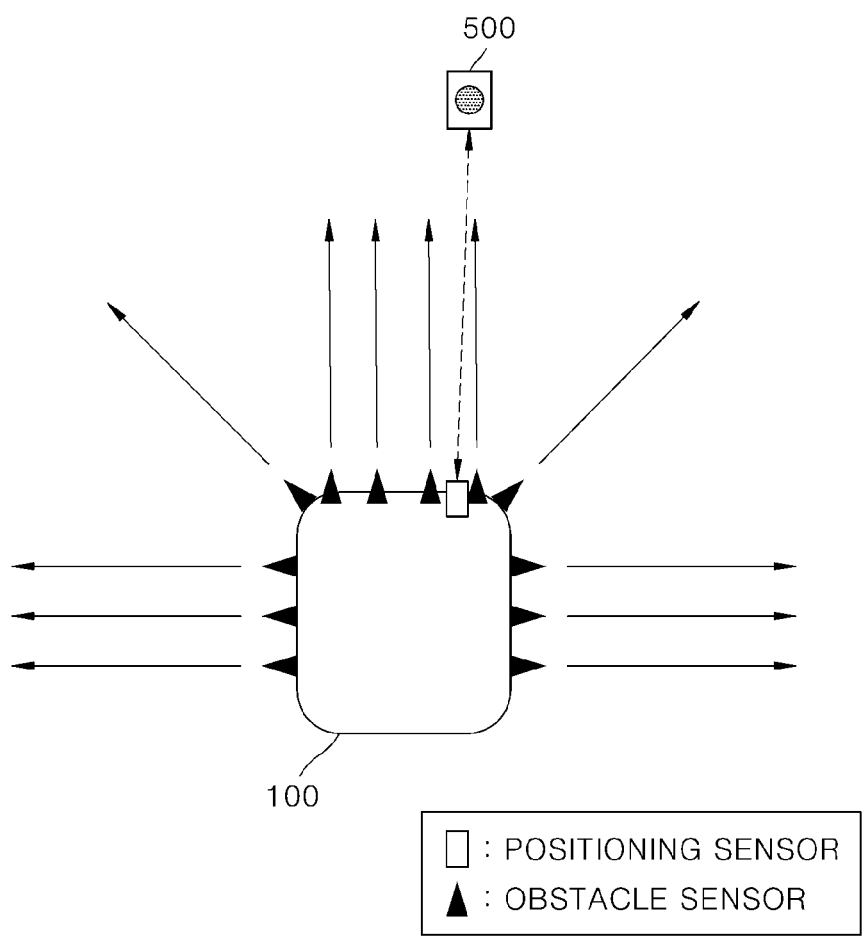
FIG. 11 is a view illustrating detection ranges and directions of a positioning sensor and a plurality of obstacle sensors disposed on the robot according to the embodiment of the present disclosure.

FIG. 11 is a view illustrating detection ranges and directions of the positioning sensor 210 and obstacle sensors 220 disposed on the robot 100 according to the embodiment of the present disclosure. The positioning sensor 210, as indicated by the dotted arrow, measures the position of the transmitter module 500. The plurality of obstacle sensors 220, as indicated by the solid arrows, detects obstacles in a front direction, in both lateral directions, and in a diagonal direction.

When a large number of obstacles are detected, the controller 250 may adjust the distance information between the transmitter module 500 and the robot 100.

Alternatively, the controller 250 may adjust the moving speed of the robot 100.

When the left and right obstacle sensors 220 detect no obstacle, the controller 250 may determine whether to rotate the robot 100 to the left or to the right using the front obstacle sensors 220.

For example, when the distances detected by the front left obstacle sensors 220 are shorter than the distances detected by the front right obstacle sensors 220, the controller 250 rotates to the right to move the robot 100 in parallel to the left installed object.

In addition, when the distances detected by the front right obstacle sensors 220 are shorter than the distances detected by the front left obstacle sensors 220, the controller 250 rotates to the left to move the robot 100 in parallel to the right installed object.

In the case of applying the above examples, robots 100 move and stop close and parallel to installed objects in a space with large transient populations or in a space such as a narrow supermarket. As a result, the robots 100 are efficiently arranged so as not to collide with each other even in a narrow space.

Particularly, when the user does not control the robot 100 (the standby state in the power assist mode) or when the user stands in the vicinity of the robot 100 (the proximity standby state in the following mode), the orderly parallel arrangement of robots 100 in a store space can reduce the degree of congestion (or complexity) in the space. Due to the parallel arrangement and stopping of the robots 100, a space is secured in which other robots and pedestrians are movable so that the traveling route of the user's robot 100 is easily generated.

When the robot 100 stops obliquely not parallel to the installed object while the user selects an article, a situation may occur in which another robot 100 does not move due to the robot 100. Therefore, the above examples solve the problem with interference with the movement of other robots 100 or pedestrians with the robot 100 stopping obliquely.

Particularly, in a space where various products are displayed or sold, the user may select an article while the user controls the robot 100 or the robot 100 moves to follow the user. That is, when the user takes his/her hand off the handle assembly or stands in the vicinity of the robot 100, the robot 100 may pause parallel to an installed object.

In the above examples, even when the robot 100 is not rectangular or square in appearance, the robot 100 may be kept parallel to an installed object on the basis of the center line or one side of the robot 100. A detailed description thereof will be given.

Figure 12:
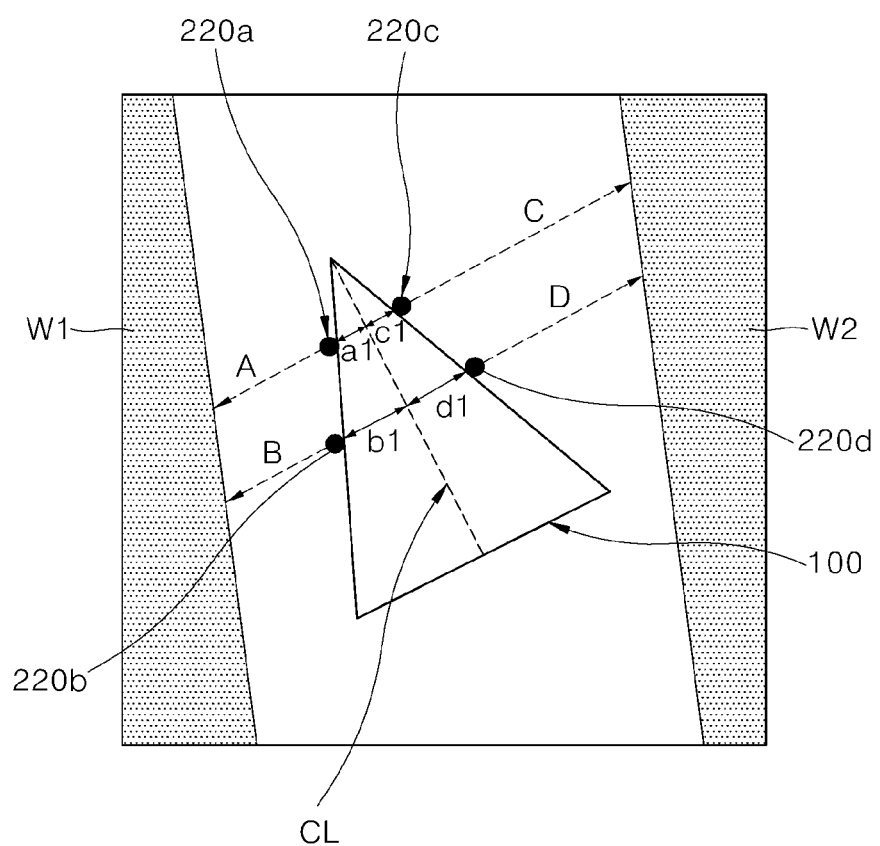
FIG. 12 illustrates a process in which, when a robot is triangular in appearance, the robot stops parallel to an installed object using obstacle sensors disposed on the side of the robot according to an embodiment of the present disclosure.

FIG. 12 illustrates a process in which, when a robot 100 is triangular in appearance, the robot 100 stops parallel to an installed object using obstacle sensors disposed on the sides of the robot 100 according to an embodiment of the present disclosure.

The robot 100, which is designated by reference numeral 100, is triangular in appearance. Four obstacle sensors 220*a*, 220*b*, 220*c*, and 220*d* are disposed on the side of the robot 100. Two obstacle sensors 220*a* and 220*b* are disposed on the left side of the robot 100, and two obstacle sensors 220*c* and 220*d* are disposed on the right side of the robot 100.

The robot has an (imaginary) center line CL indicated at the center thereof. In order for the robot 100 to be parallel to an installed object W1 or W2, the robot 100 may be stopped such that the left or right side thereof is parallel to the installed object. Alternatively, in order for the robot 100 to be parallel to the installed object W1 or W2, the robot 100 may be stopped such that the center line CL thereof is parallel to the installed object.

Reference numeral A refers to a distance to a left obstacle detected by the left front obstacle sensor 220*a*. Reference numeral a1 refers to a distance between the left front obstacle sensor 220*a* and the center line CL.

Reference numeral B refers to a distance to the left obstacle detected by the left rear obstacle sensor 220*b*. Reference numeral b1 refers to a distance between the left rear obstacle sensor 220*b* and the center line CL.

Reference numeral C refers to a distance to a right obstacle detected by the right front obstacle sensor 220*c*. Reference numeral c1 refers to a distance between the right front obstacle sensor 220*c* and the center line CL.

Reference numeral D refers to a distance to the right obstacle detected by the right rear obstacle sensor 220*d*. Reference numeral d1 refers to a distance between the right rear obstacle sensor 220*d* and the center line CL.

In order for the robot 100 to stop with the center line CL of the robot 100 being parallel to the installed object W1, the movement of the robot 100 may be controlled such that the combined distance A+a1 of the distances a1 and A and the combined distance B+b1 of the distances b1 and B are equal to each other or the difference in distance is within an error range.

In order for the robot 100 to stop with the center line CL of the robot 100 parallel to the installed object W2, the movement of the robot 100 may be controlled such that the combined distance C+c1 of the distances c1 and C and the combined distance D+d1 of the distances d1 and D are equal to each other or the difference in distance is within an error range.

Here, each of the four obstacle sensors 220a, 220b, 220c, and 220d may detect a distance from the center line CL to the associated obstacle disposed in a direction perpendicular to the center line CL.

In order for the robot 100 to stop with the left side thereof parallel to the installed object, the movement of the robot 100 may be controlled such that the distances A and B are equal to each other or the difference between the distances A and B is within an error range. In addition, in order for the robot 100 to stop with the right side thereof parallel to the installed object, the movement of the robot 100 may be controlled by the controller 250 via the movement unit 190, such that the distances C and D are equal to each other or the difference between the distances C and D is within an error range.

Figure 13:
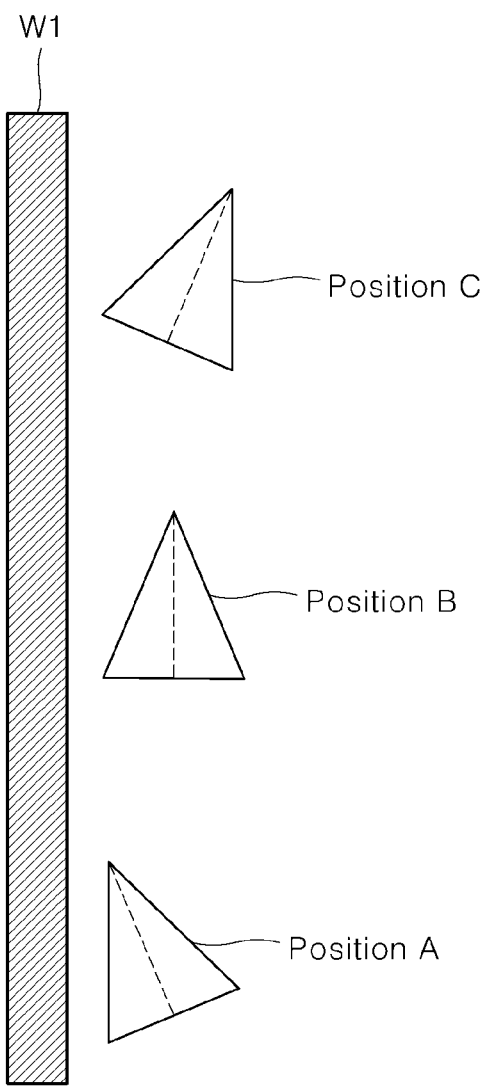
FIG. 13 illustrates an example in which the robot of FIG. 12 stops parallel to the installed object according to the embodiment of the present disclosure.

FIG. 13 illustrates an example in which the robot 100 of FIG. 12 stops parallel to the installed object according to the embodiment of the present disclosure. The dotted line indicated at the center of each robot position A, B, or C refers to a center line.

The first robot position A of FIG. 13 is illustrated as stopping with the left side thereof parallel to an installed object W1. The second robot position B of FIG. 13 is illustrated as stopping with the center line thereof parallel to the installed object W1. The third robot position C of FIG. 13 is illustrated as stopping with the right side thereof parallel to the installed object W1.

Figure 14:
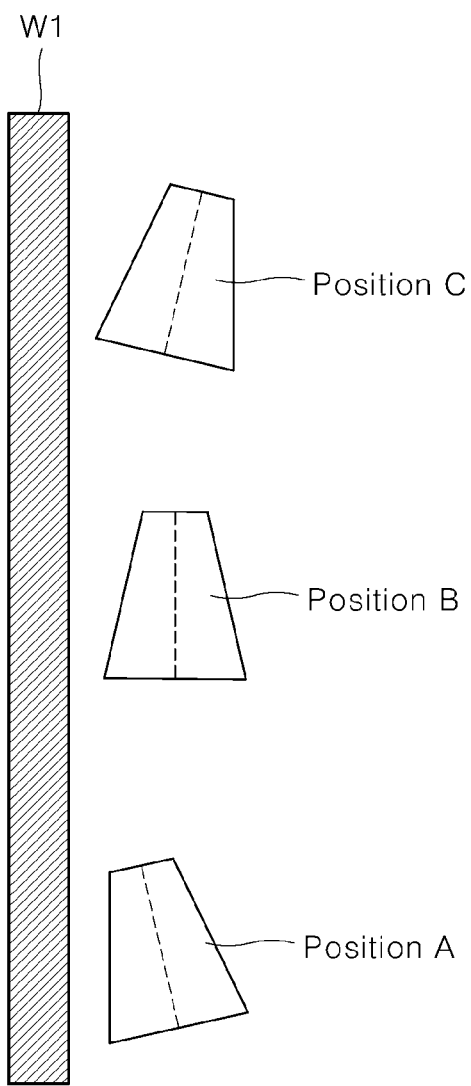
FIG. 14 illustrates an example in which a trapezoidal robot similar to that of FIG. 12 stops parallel to an installed object.

FIG. 14 illustrates an example in which a trapezoidal robot 100 similar to that of FIG. 12 stops parallel to an installed object. The first robot position A of FIG. 14 is illustrated as stopping with the left side thereof parallel to an installed object W1. The second robot position B of FIG. 14 is illustrated as stopping with the center line thereof parallel to the installed object W1. The third robot position C of FIG. 14 is illustrated as stopping with the right side thereof parallel to the installed object W1.

As described with reference to FIGS. 12 to 14, even when the robot 100 is not rectangular or square in appearance, the robot 100 may stop parallel to the Installed object on the basis of the center line or one side of the robot 100.

The parallel stop of the robot 100 such as reference numeral A of FIG. 13 and reference numeral A of FIG. 14 may be applied to the case where a large number of people or articles move in a space. That is, when the obstacle sensors 220 of the robot 100 detect a large number of surrounding transient populations or articles, the controller 250 may dispose the robot 100 at position A as close to the installed object W1 as possible. To this end, the controller 250 checks whether the robot 100 is parallel to the installed object W1 based on one side of the robot 100 (the left side of the robot 100 in FIGS. 13 and 14). As illustrated in FIG. 12, the controller 250 may check whether the robot 100 at position A is parallel to the installed object W1 based on only the distances A and B.

On the contrary, when articles are loaded in the installed object W1 like a stand, the vertical plane of the installed object W1 may be deduced complicatedly due to the loading of the articles. In this case, the robot 100 may be disposed at position C of FIG. 13 and at position C of FIG. 14 since the robot 100 at position C may collide with the articles in the stand when approaching the same.

That is, the controller 250 may dispose the robot 100 at position C to be spaced apart from the installed object W1. To this end, the controller 250 checks whether the robot 100 is parallel to the installed object W1 based on one side of the robot 100 (the right side of the robot 100 in FIGS. 13 and 14). As illustrated in FIG. 12, the controller 250 may check whether the robot 100 at position C is parallel to the installed object W1 based on the distance A+a1+c1 and the distance B+b1+d1.

In summary, in an example of the shape of the robot 100, the robot 100 has left and right sides that are not parallel to each other. In this case, the controller 250 determines whether the robot 100 is parallel to the installed object, based on any one of the left and right sides of the robot 100, according to the number of obstacles detected by the obstacle sensors 220, the moving speed of each of the obstacles, or the protruding state of the vertical plane of the installed object. In an example, the number of obstacles is the number of obstacles detected by the obstacle sensors 220 and the number of obstacles within a certain distance may be reflected for accuracy. In addition, the moving speed of the obstacle is the moving speed of the obstacle detected by the obstacle sensors 220. When a large number of obstacles are present or the moving speed of each obstacle is fast, the robot 100 at position A of FIGS. 13 and 14 approaches the installed object W1.

In an example, the protruding state of the vertical plane of the installed object is a state in which a large number of articles are arranged on the vertical plane or arranged to protrude from the installed object such as a stand. Also, this state corresponds to even when the installed object itself has a protruding shape not a plane. Here, the robot 100 at position C of FIGS. 13 and 14 is spaced apart from the installed object W1.

As apparent from the above description, in accordance with the exemplary embodiments of the present disclosure, it is possible to increase movement efficiency in the space in such a manner that the robot 100 remains stopped after moving close and parallel to the installed object, such as a wall or a stand, by detecting the distance from the installed object when the robot is intended to temporarily stop.

In accordance with the exemplary embodiments of the present disclosure, since the robot remains stopped after moving in parallel to avoid a collision with a plurality of robots, it is possible to reduce a possibility of collision between the autonomous or semi-autonomous robot and other robots.

In accordance with the exemplary embodiments of the present disclosure, since the in-space installed object can be detected by a small number of sensors to move the robot in parallel to the installed object, it is possible to temporarily stop the robot without any separate device.

The present disclosure is not limited to the above effects, and it should be understood that the present disclosure has various effects which can be easily derived from the configuration of the disclosure by those skilled in the art.

When all elements of the embodiments of the disclosure are described to be combined into one element or to operate in combination, the disclosure is not limited to the embodiments and all the elements may be selectively combined to operate within the scope of the disclosure. All the elements may be embodied can be embodied as independent hardware pieces, respectively, or some or all of the elements may be selectively combined and may be embodied as a computer program including a program module that performs some or all functions combined into one or more hardware pieces. Codes or code segments of the computer program can be easily inferred by those skilled in the art. The computer program can be stored in a computer-readable recording medium and can be read and executed by a computer, whereby the embodiments of the disclosure can be realized. Examples of a storage medium having stored the computer program include storage mediums such as a magnetic recording medium, an optical recording medium, and a semiconductor recording medium. The computer program for realizing the embodiments of the disclosure includes a program module which is transmitted via an external device in real time.

While embodiments of the disclosure have been described above, various changes or modifications can be made thereon by those skilled in the art. Accordingly, it should be understood that such changes and modifications belong to the scope of the disclosure without departing from the scope of the disclosure.

What is claimed is:

1. A robot, comprising:
   a motor assembly for moving the robot;
   an obstacle sensor configured to:
      detect obstacles disposed around the robot, and
      calculate a distance from the robot to each of the obstacles;
   a handle assembly;
   a force sensor configured to detect a change in force applied to the handle assembly of the robot and
   a controller configured to:
      control the robot using a power assist mode with a travelling state and a standby state,
      control a moving direction or a moving speed of the motor assembly according to the change in force detected by the force sensor,
      determine the standby state of the robot when the force sensor detects no force applied to the handle assembly of the robot,
      detect an installed object among the obstacles, and
      control the motor assembly to move the robot parallel to and adjacent to a vertical plane of the installed object and to stop the robot,
   wherein the vertical plane is the surface of the installed object and is perpendicular to a floor where the installed object is placed, and
   wherein the controller is further configured to determine the vertical plane of the installed object using an imaginary plane that reflects portions protruding and recessed from an outer portion of the installed object.

2. The robot according to claim 1, wherein the obstacle sensor calculates the distance from the robot to each of the obstacles by calculating a distance from at least one obstacle among the obstacles disposed to the left of the robot and a distance from at least one obstacle among the obstacles disposed to the right of the robot,
   wherein the installed object is closest to the robot among the obstacles, and
   wherein the controller is further configured to move the robot parallel to the installed object and adjacent to the installed object by moving the robot forward or backward to the installed object.

3. The robot according to claim 2, wherein the controller is further configured to control the motor assembly to move the robot within a first predetermined distance to the installed object and then rotate the robot to be parallel to the installed object.

4. The robot according to claim 2, wherein the obstacle sensor is among a plurality of obstacles sensors provided on the robot,
   wherein the plurality of obstacles sensors comprise two left obstacle sensors and two right obstacle sensors, and
   wherein the controller is further configured to determine that the installed object is closest to the robot by comparing distances to each of the obstacles obtained from the two left obstacle sensors and distances obtained from the two right obstacle sensors.

5. The robot according to claim 4, wherein the two left obstacle sensors include:
   a left front obstacle sensor disposed at a front-left position on the robot; and
   a left rear obstacle sensor disposed at a rear-left position on the robot, and
   wherein the two right obstacle sensors include:
   a right front obstacle sensor disposed at a front-right position of the robot; and
   a right rear obstacle sensor disposed at a rear-right position of the robot.

6. The robot according to claim 5, wherein the controller is further configured to compare the distances to corresponding obstacles among the obstacles obtained from the two left obstacle sensors and distances to corresponding obstacles among the obstacles obtained by the two right obstacle sensors by:
   selecting a first minimum distance of distances detected by the left front obstacle sensor and left rear obstacle sensor, and a second minimum distance of distances detected by the right front obstacle sensor and right rear obstacle sensor, and
   comparing the first minimum distance to the second minimum distance,
   wherein the controller is further configured to start a left stop mode when the first minimum distance is smaller than the second minimum distance, and
   wherein the controller is further configured to start a right stop mode when the second minimum distance is smaller than the first minimum distance.

7. The robot according to claim 6, wherein the controller is further configured to control the motor assembly in the left stop mode to move the robot such that a distance detected by the left front obstacle sensor or the left rear obstacle sensor reaches a threshold value, and
   wherein the controller is further configured to control the motor assembly in the right stop mode to move the robot such that a distance value detected by the right front obstacle sensor or the right rear obstacle sensor reaches the threshold value.

8. The robot according to claim 1, further comprising a positioning sensor configured to measure a position of a transmitter module by receiving a signal from the transmitter module,
   wherein the controller is further configured to generate a moving route corresponding to the position of the transmitter module, and
   wherein the controller is further configured to determine the standby state of the robot when a distance between the transmitter module and the robot is less than or equal to a second predetermined distance based on the position of the robot.

9. The robot according to claim 1, wherein the controller is further configured to:
   store the distances calculated by the obstacle sensor in memory, and
   calculate positions of the obstacles relative to the robot using the stored distances with respect to a moving route of the robot.

10. The robot according to claim 9, wherein the controller is further configured to calculate the positions of the obstacles when obstacles are present by determining first straight lines in a first plane representative of obstacles in the first plane, and a second straight line representing an obstacle in a second plane.

11. The robot according to claim 1, wherein the robot has a left side and a right side,
   wherein the left side of the robot is not parallel to the right side of the robot, and
   wherein the controller is further configured to determine whether the robot is parallel to the installed object, based on one of the left side of the robot and the right side of the robot, and at least one of a moving speed of each obstacle, and a protruding state of the object in the vertical plane.

12. A method of controlling a robot, the robot comprising an obstacle sensor, a controller, a motor assembly, a handle assembly and a force sensor configured to detect a change in force applied to the handle assembly of the robot, the method comprising:
   controlling, by the controller, the robot using a power assist mode with a travelling state and a standby state;
   controlling, by the controller, a moving direction or a moving speed of the motor assembly according to the change in force detected by the force sensor;
   determining, by the controller, the standby state of the robot when the force sensor detects no force applied to the handle assembly of the robot;
   detecting, by the obstacle sensor, obstacles disposed around the robot;
   calculating, by the obstacle sensor, distances between the robot and each of the obstacles;
   detecting, by the controller, an installed object among the obstacles having a shortest distance to the robot; and
   controlling, by the controller, the motor assembly to move the robot such that the robot is positioned parallel to and adjacent to a vertical plane of the installed object and stopping the robot,
   wherein the vertical plane is a surface of the installed object and is perpendicular to a floor where the installed object is placed, and
   wherein the controller determines the vertical plane of the installed object using an imaginary plane that reflects portions protruding and recessed from an outer portion of the installed object.

13. The method according to claim 12, further comprising:
   calculating, by the obstacle sensor, the distance from the robot to each of the obstacles by calculating a distance from obstacles disposed to the left of the robot and a distance from obstacles disposed to the right of the robot, wherein the installed object is closest to the robot among the obstacles; and
   controlling, by the controller, the motor assembly to move the robot parallel to the installed object and adjacent to the installed object by moving the robot forward or backward to the installed object.

14. The method according to claim 12, wherein controlling the motor assembly includes moving the robot within a first predetermined distance to the installed object and then rotating the robot to be parallel to the installed object.

15. The method according to claim 13, wherein the obstacle sensor is among a plurality of obstacles sensors provided on the robot, wherein the obstacles sensors comprise two left obstacle sensors and two right obstacle sensors, and further comprising:
   determining, by the controller, that the installed object is closest to the robot by comparing distances to each of the obstacles obtained from the two left obstacle sensors and distances obtained from the two right obstacle sensors.

16. The method according to claim 12, further comprising:
   storing, by the controller, the distances calculated by the obstacle sensor in memory; and
   calculating, by the controller, positions of the obstacles relative to the robot using the stored distances with respect to a moving route of the robot,
   wherein the calculating the positions of the obstacles includes determining first straight lines in a first plane representative of obstacles in the first plane, and a second straight line representing an obstacle in a second plane.

17. The method according to claim 12, further comprising determining, by the controller, whether the robot is parallel to the installed object based on a center line of the robot.

18. The method according to claim 17, wherein the robot has a left side and a right side,
   wherein the left side of the robot is not parallel to the right side of the robot, and
   wherein the method further comprises determining, by the controller, whether the robot is parallel to the installed object, based on one of the left side of the robot and the right side of the robot, and at least one of a moving speed of each obstacle, and a protruding state of the installed object in the vertical plane.

* * * * *